Figure 1:
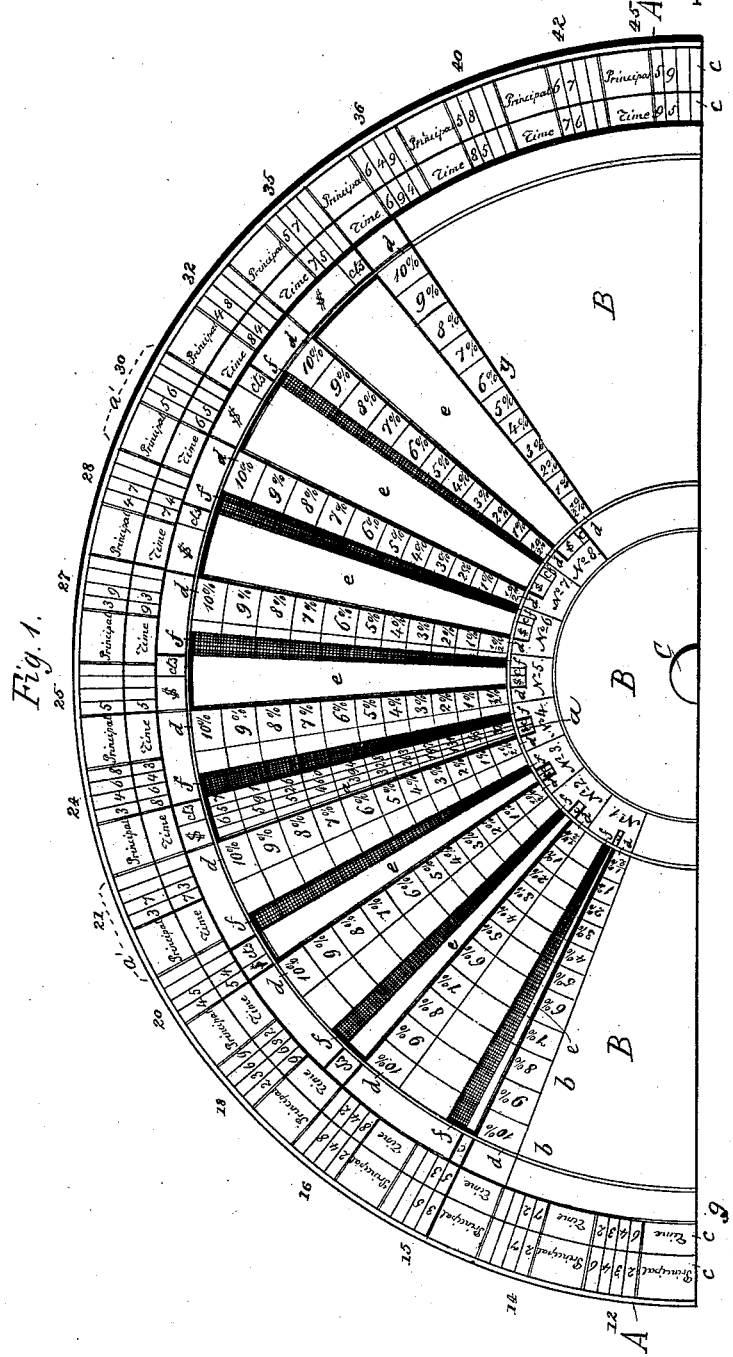

(Model.)

3 Sheets—Sheet 1.

A. DAVIDSON.
INTEREST CALCULATOR.

No. 297,573. Patented Apr. 29, 1884.

WITNESSES
Wm. A. Lowe
Clarence W. Francis

INVENTOR
Arnold Davidson

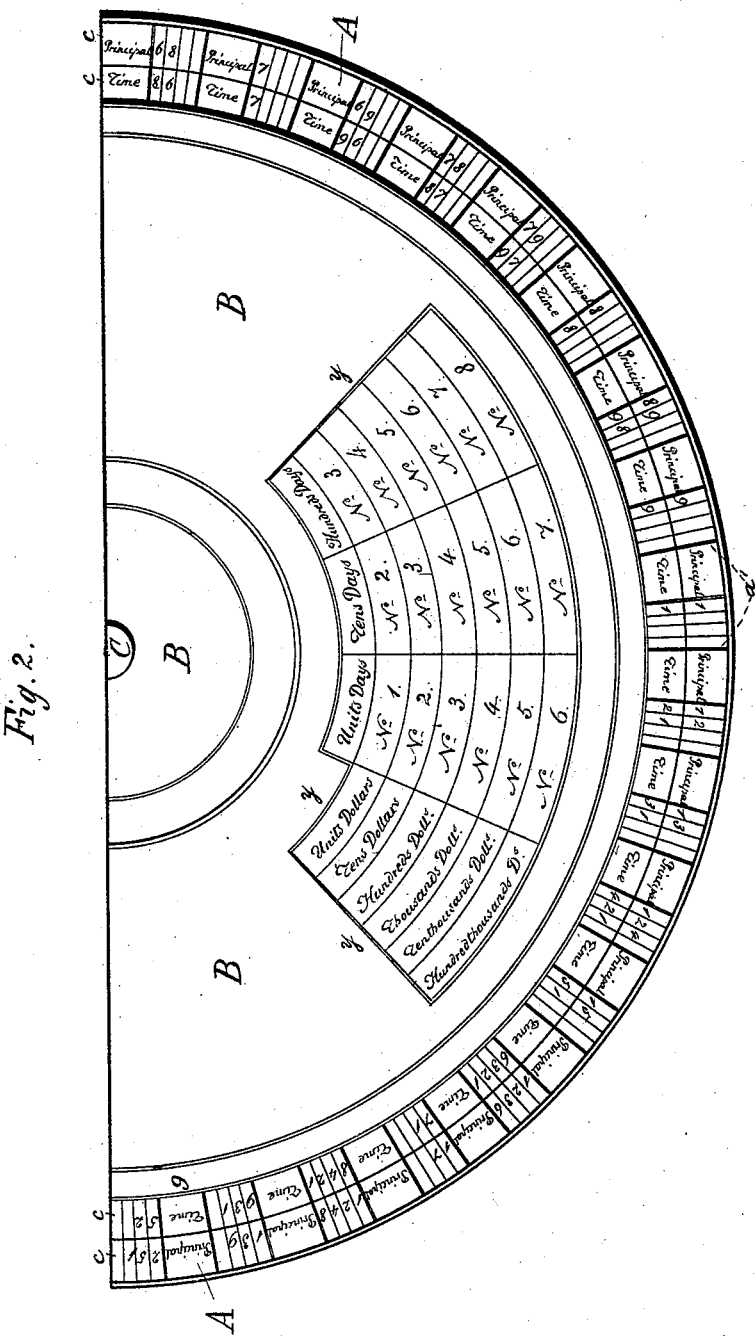

(Model.)
3 Sheets—Sheet 3.
A. DAVIDSON.
INTEREST CALCULATOR.
No. 297,573. Patented Apr. 29, 1884.
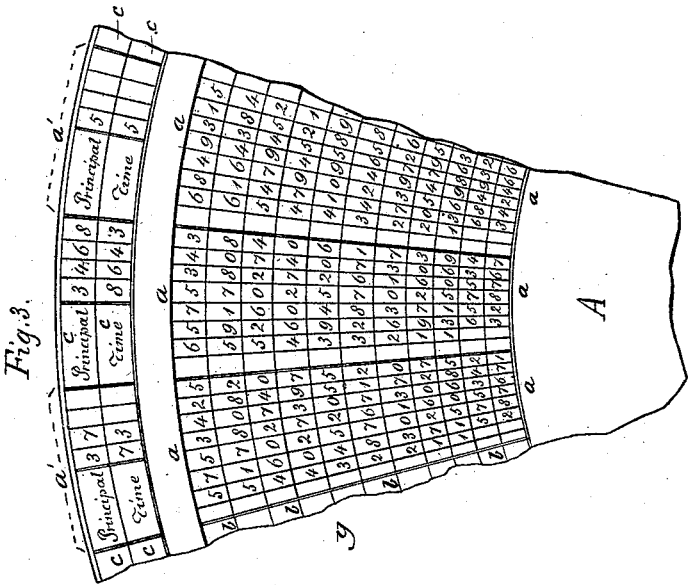
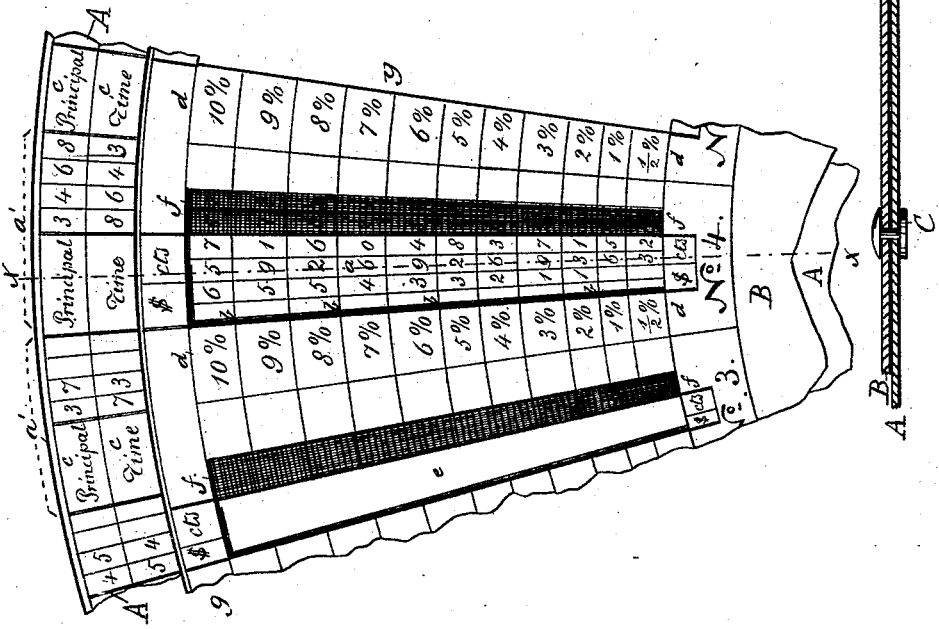
WITNESSES
Wm A Lowe
Clarence W Francis
INVENTOR
Arnold Davidson
N. PETERS, Photo-Lithographer, Washington, D. C.

UNITED STATES PATENT OFFICE.

ARNOLD DAVIDSON, OF BROOKLYN, NEW YORK.

INTEREST-CALCULATOR.

SPECIFICATION forming part of Letters Patent No. 297,573, dated April 29, 1884.

Application filed August 16, 1883. (Model.)

*To all whom it may concern:*

Be it known that I, ARNOLD DAVIDSON, a citizen of the United States, residing in the city of Brooklyn, county of Kings, State of New York, have invented a new and useful Improved Interest-Calculator or Metric Interest-Table, of which the following is a specification, having reference to the accompanying drawings, forming part thereof.

The interest-calculating devices heretofore used have been made by taking one of the elements in the interest-calculation problem—of principal, of rate, or of time—as a fixed and invariable standard, and consequently show either the interest computed at a single rate on various amounts of principal for various periods of time, or the interest on a single amount of principal at various rates for various periods of time, or else the interest for a single period of time on various amounts of principal at various rates, but do not admit in one and the same device of the variation of all of the elements of the interest-calculation problems.

The object of my invention is to produce a simple and expeditious interest-calculating device which will show the interest on any principal for any period of time at any rate percentage. The device, as shown, gives, by means of simple mechanical adjustment, the interest on amounts from one dollar to nine dollars and multiples of the same by ten, one hundred, one thousand, ten thousand, and one hundred thousand for periods of from one day to nine days and multiples of the same by ten and one hundred at as many different rates of percentage as may be desired, and by the further process of addition of the so-computed interest on any amount to nine hundred and ninety-nine thousand nine hundred and ninety-nine dollars for any period up to nine hundred and ninety-nine days. In the example shown and described it gives the interest on these amounts of principal and for these periods of time at eleven different rates of percentage.

The drawings, in which the same letters of reference indicate like parts, represent, in Figures 1 and 2, a plan view of the interest-calculator or metric interest-table with aperture No. 4 in position; in Fig. 3, a section of the lower disk, A; in Fig. 4, an enlarged section of the calculator with aperture No. 4 in the same position as shown in Fig. 1; in Fig. 5, a vertical section of Fig. 4 on the line of X X.

A represents the lower disk; B, the upper disk; C, the rivets securing disks A and B to each other; Y, a table directing the use of the different apertures; $a$, the sectoral columns within the plane of the twelve inner concentric circles of the lower disk, A; $b$, the eleven inner concentric circular spaces of the lower disk, A; $c$, the two outer concentric circular spaces of the lower disk, A, being that part of this disk which is exposed to view when the upper and smaller disk, B, is superincumbent upon it; $a'$, the thirty-six sectoral columns of the two outer concentric spaces, $c$, corresponding to the sectoral columns $a$ of the eleven inner concentric circular spaces, $b$; $d$, the marginal spaces of the eight sectoral columns of the upper disk, B; $e$, the apertures in the eight sectoral columns of the upper disk, B, the spaces covered with tracing-cloth or other transparent material, $f$; $g$, dollar and cent signs of various periods.

The device shown in the drawings consists of the two plane disks A and B—one superincumbent upon the other—composed of cardboard or other suitable material, constructed and inscribed as below specified, and so secured to each other at their centers C as to permit of independent rotary movements. The lower and larger of these disks, A, is divided into fourteen concentric circular spaces, if no more than eleven rates of percentage are required. If more, one space is added for each additional rate. These concentric circular spaces are divided by radii into thirty-six or more equal divisions, forming sectoral columns. These thirty-six sectoral columns $a$ are each subdivided within the eleven concentric circular spaces $b$ by seven radial lines, thereby providing eight spaces for interest amounts expressed in as many figures. The two outer concentric circular spaces, $c$, are denominated the one "Principal," the other "Time," or vice versa, which denomination is inscribed in each of the thirty-six sectoral columns $a'$ of the two outer concentric circular spaces, $c$. In each of these sectoral columns $a'$, I also place the factors of a common multiple, the various multiplicands of one such multiple in the space c denominated "Principal," and the various multipliers of the same multiple in the space c denominated "Time," or vice versa, selecting for the device, as shown, such common multiples as are the result of the multiplication of the numbers one to nine with the numbers one to nine; and leaving out all repetitions by the aforesaid arrangement of the factors, there are left only thirty-six original common multiples. This arrangement can be continued to any extent, being limited simply by the space to be occupied, unnecessary repetition and labor being avoided by using the common multiple in the manner above stated. For instance, the interest on three dollars for eight days, on four dollars for six days, on six dollars for four days, and on eight dollars for three days is precisely the same, the rate being uniform. This interest expressed in proper and sufficient figures decimally is also the interest on any multiple by ten, one hundred, one thousand, ten thousand, and one hundred thousand of the above amounts for the time set opposite the same, the decimal-point only being moved in accordance with the arithmetical rule that the numbers of decimal places in the result (i. e., the said interest) must equal the sum of the places in the multiplicand added to those in the multiplier, and the time can also be increased correspondingly by ten and one hundred by simply moving the decimal-point in the said result as aforesaid. Therefore, in the above example, the result of seventy-two distinct calculations of interest at a given rate of percentage is expressed by a single product by simply changing the position of the decimal-point when necessary.

Having arranged the "Principal" and "Time" lines as above indicated, I place in the thirty-six sectoral columns a of the eleven inner concentric circular spaces, b, the interest, expressed decimally and extended to from five to eight figures, on the amount of principal and for the period of time as found in the two outer concentric circular spaces, c, and at the rate of percentage as placed in the margin d of the aperture e of the upper disk, B, hereinafter described, so that for the first sectoral column, a', I place on the line of the innermost of the eleven inner concentric circular spaces the interest on one dollar for one day at one-half per cent., expressed decimally in five figures; on the line of the next concentric circular space, the interest on the same amount for the same period of time at one per cent.; in the next, the same at two per cent.; and so on, in regular progression, up to ten per cent., with gradual increase, expressed in six figures, repeating this in each of the remaining sectoral columns a, but varying the interest according to the various principals and times found in the corresponding sectoral column, a', of the two outer concentric circular spaces, c, so that on arriving at the sectoral column having 9 in the "Principal" and 9 in the "Time" space, I place on the line of the innermost of the eleven inner concentric circular spaces the interest, represented by seven figures, on nine dollars for nine days at one-half per cent.; on the line of the next concentric circular space, the interest on the same amount for the same period of time at one per cent.; on the next, the same at two per cent.; and so on, in regular progression, up to ten per cent., with its gradual increase expressed in eight figures.

As it is customary among some merchants and bankers to calculate interest on the basis of three hundred and sixty days per annum, two distinct computations may be used, based, respectively, on three hundred and sixty-five days and on three hundred and sixty days per annum. The figures in the device shown are based on the former system.

The upper and smaller disk, B, extends to the second outermost circle, c, of the lower disk, A. This upper disk or dial, B, is in part divided by radii into eight sectoral columns, and each of these sectoral columns is subdivided by eleven arcs of concentric circles, the same as and corresponding to the sectoral columns a and their concentric circles b on the lower disk, A. Each of these eight sectoral columns is provided with a marginal space, d, which space is likewise divided by eleven arcs of concentric circles corresponding to the circles b. On the line of each of these concentric arcs in the said marginal space d is placed one of the different rates of percentage, commencing at the inner arc with the lowest rate and continuing outward, in regular progression, to the highest rate, or vice versa. Each of the eight sectoral columns of this upper disk, B, is provided with an aperture, e, the width of which is regulated according to the number of subdivisions of the sectoral column a of the lower disk, A, which it is desired to expose. The first of these apertures, proceeding from left to right, is the size of three of the said subdivisions, the second of four, and so on, Nos. 6, 7, and 8 being the size of one sectoral column a. Underneath the upper disk, B, is fixed tracing-cloth or other transparent material, f, so arranged as to extend on the right-hand side of and partly over the side of seven of these apertures, being made in the first six apertures to cover a space equal to two of the subdivisions of the sectoral columns a of the lower disk, A, and in the seventh to cover only one of such subdivisions to indicate decimal fractions, as hereinafter mentioned. Above and below the apertures, commencing at the left hand, are inscribed the signs of dollars and cents in constantly-increasing periods, g, as shown in the drawings— i. e., on 1 and 2 "Cents"; on the left-hand side of 3, "Dollars"; the remaining spaces, "Cents;" on 4, the two left-hand spaces; on 5, the three left-hand spaces; on 6, the four; on 7, the five; and on 8 the six left-hand spaces are marked "Dollars," all the remaining spaces in each being marked "Cents," excluding in each instance the space above and below the portion of the apertures covered by tracing-cloth $f$, as aforesaid.

The calculator or metric interest-table can be used upon a device having a rectangular plane surface, with the computations of interest placed in vertical columns instead of in sectoral columns, and with the "Principal" and "Time" arranged upon the same principle, and in accordance with the same arrangement and in combination, as in the case of the lower disk, A, above described. In such an arrangement the marginal columns $d$ of the apertures on the upper disk, B, containing the different rates of percentage will be placed on the left of each of the vertical columns. In place of the apertures $e$ on the upper disk, B, a ruler or other suitable instrument is used having a scale thereon graduated corresponding to the apertures $e$ of the upper disk, B, for the purpose of mechanically moving the decimal-point and defining the division between "Dollars" and "Cents."

Either of the above devices could also be constructed by placing the "Rate" and "Time" or the "Principal" and "Rate" in the spaces in the outer circles, $c$, of the lower disk, A, or above the vertical columns. In that event it is only necessary to place the rejected element (i. e., the "Principal" or the "Time," as the case may be) in the marginal spaces $d$ of the upper disk or to the left of the vertical columns.

To use the calculator or metric interest-table, I find on the lower disk, A, the sectoral column $a'$, having in the "Principal" and "Time" spaces $c$ the left-hand figure of the given principal and the left-hand figure of the given time, and place over the corresponding sectoral column $a$, as shown in Figs. 1 and 4, the required aperture, which is found by a reference to the table Y; and, being guided by the per cent. rate as found in the margin $d$ of the aperture $e$ of the upper disk, B, I read off the corresponding interest. At the same time the fractional part of such interest is seen through the tracing-cloth $f$. If this is under fifty-hundredths, it is disregarded. If fifty or over, one cent is added to the interest. If the principal, time, or rate is represented by a compound figure, I proceed in the same manner—e. g., if the interest is to be computed on six hundred and fifty dollars for nineteen days at four and one-half per cent., I find, as hereinbefore described, first, the interest on six hundred dollars for ten days at four per cent., and at the same time at one-half per cent.; then on fifty dollars for ten days at four per cent. and one-half per cent.; then on six hundred dollars for nine days at four per cent. and one-half per cent., and then on fifty dollars for nine days at four per cent. and one-half per cent., and add the different interest amounts together, but use, at the same time, each of the fractions as shown through the tracing-cloth $f$, and only treat the resultant fraction as above indicated.

The position of aperture No. 4, as shown in Figs. 1 and 4, gives the interest at eleven different rates of percentage from one-half per cent. to ten per cent. on either thirty dollars, forty dollars, sixty dollars, or eighty dollars for, respectively, eight hundred, six hundred, four hundred, or three hundred days; or on three hundred dollars, four hundred dollars, six hundred dollars, or eight hundred dollars for, respectively, eighty, sixty, forty, or thirty days; or on three thousand dollars, four thousand dollars, six thousand dollars, or eight thousand dollars for, respectively, eight, six, four, or three days; or on two hundred and forty dollars, two thousand four hundred dollars, or twenty-four thousand dollars for, respectively, one hundred, ten, or one day; or on one hundred and twenty dollars, twelve hundred dollars, or twelve thousand dollars for, respectively, two hundred, twenty, or two days; or on four hundred and eighty dollars or four thousand eight hundred dollars for, respectively, fifty or five days; or on one hundred and sixty dollars or sixteen hundred dollars for, respectively, one hundred and fifty or fifteen days; or on seventy-five dollars or seven hundred and fifty dollars for, respectively, three hundred and twenty or thirty-two days; or on three hundred and twenty dollars for seventy-five days; or on ninety-six dollars or nine hundred and sixty dollars for, respectively, two hundred and fifty or twenty-five days; or on two hundred and fifty dollars for ninety-six days; or on three hundred and seventy-five dollars for sixty-four days; or on sixty-four dollars for three hundred and seventy-five days; or on one hundred and ninety-two dollars for one hundred and twenty-five days; or on one hundred and twenty-five dollars for one hundred and ninety-two days, so that by means of the adjustment of aperture No. 4 upon the lower disk, A, as shown in Figs. 1 to 4, the result of three hundred and fifty-two different interest-calculation problems is given.

Having thus described my invention, what I claim as new, and desire to secure by Letters Patent, is—

1. An interest-calculating device having parts adjustable one with relation to the other, upon which are displayed a table of interest and different expressions of each of the elements of principal, of rate, and of time in the interest-calculation problem, whereby such device is adapted to admit of the variation of the value of each and every of such elements, and thus show any amount of interest sought for, substantially as described.

2. A device for calculating interest which admits of the variation of any one of the three elements in the interest-calculation problem of principal, of rate, and of time, consisting of a lower disk or table bearing two of such elements, in conjunction with an interest-table and an upper disk or indicator bearing the remaining element, substantially as described.

3. In combination with an interest-calculating device, a table having grouped together pairs of factors, each of which pair has a common multiple with the others of the same group, such group consisting of two of the elements of the interest-calculation problem of principal, of rate, or of time, substantially as described.

4. In combination with a superincumbent disk or indicator, a lower disk or other device having thereon an interest-table, a part whereof consists of two of the three elements in the interest-calculation problem of principal, time, or rate, grouped together in pairs, each pair of which respectively is composed of two factors of a multiple common to it and every other pair of the same group, substantially as described.

5. In a device for calculating interest, an indicator having apertures of various widths therein, and having inscribed thereon adjacent to such apertures the different values of one of the three elements in the interest-calculation problem of principal, of rate, and of time, in combination with another disk or table bearing computations of interest, and, in connection therewith, the two remaining elements, substantially as herein shown and described.

6. An interest-calculator consisting of an indicator having apertures of various widths therein, and adjacent to such apertures different expressions of rates of percentage, in combination with an interest-table displayed in columns upon a disk or other device, and having, in connection with such columns, different expressions of the elements of principal and of time, substantially as herein shown and described.

7. In combination with a calculating device having a table of figures thereon, an indicator having apertures therein, and tracing-cloth or other transparent material covering a portion of such apertures, substantially as and for the purpose set forth.

8. In an interest-calculating device, a lower disk or device having a computation table or tables thereon, and different expressions of two of the elements of the interest-calculation problem, in combination with an upper disk or indicator having therein apertures of various widths and bearing different expressions of the third element, substantially as herein described.

9. In a calculating device, a lower disk or device having a computation table or tables thereon and different expressions of two of the elements in the interest-calculation problem, in combination with an upper disk or indicator having apertures of various widths, adjacent to which are figure-columns and different expressions of the third element, substantially as described.

10. In combination with a lower disk having interest-computations thereon, a superincumbent revoluble indicator having a space or spaces thereon adapted to expose the subjacent interest-columns, and upon the margin of such space or spaces dollar and cent signs in various periods, whereby the proper value of the figures in the interest-computations displayed beneath is indicated, substantially as described.

11. The combination of the projecting disk A with the upper disk, B, having therein apertures $e$ and partial coverings $f$ of transparent material, and the interest table or tables constructed and arranged for the purposes and substantially as shown and described.

ARNOLD DAVIDSON.

Witnesses:
CLARENCE W. FRANCIS,
F. A. DOYLE.